United States Patent [19]
Bissell

[11] Patent Number: 4,896,395
[45] Date of Patent: Jan. 30, 1990

[54] REARVIEW MIRROR WIPER ATTACHMENT

[76] Inventor: Kendall G. Bissell, 8698 Caselman Rd., Sacramento, Calif. 95828

[21] Appl. No.: 266,889

[22] Filed: Nov. 3, 1988

[51] Int. Cl.$^4$ .............................................. B60S 1/10
[52] U.S. Cl. ................................ 15/250 B; 15/250.29
[58] Field of Search ............ 15/250 B, 250.29, 250.26, 15/246

[56] References Cited

U.S. PATENT DOCUMENTS

| | | |
|---|---|---|
| 3,685,087 | 8/1972 | Pittman . |
| 3,866,258 | 2/1975 | DeGraw . |
| 3,968,537 | 7/1976 | Wagenhofer . |
| 4,037,286 | 7/1977 | Medearis et al. . |
| 4,212,091 | 7/1980 | Jones . |
| 4,306,328 | 12/1981 | Layton . |
| 4,307,482 | 12/1981 | Palmer . |
| 4,339,169 | 7/1982 | Addison, Jr. . |
| 4,455,597 | 7/1984 | DeGideo ............................ 15/250 B |
| 4,459,718 | 7/1984 | Hewitt et al. ...................... 15/250 B |
| 4,527,301 | 7/1985 | Seitz .................................. 15/250 B |
| 4,763,381 | 8/1988 | Williams ....................... 15/250 B X |

Primary Examiner—Frankie L. Stinson
Attorney, Agent, or Firm—Wells, St. John & Roberts

[57] ABSTRACT

A wiper attachment is described that can be mounted to existing, conventional rearview mirrors. The attachment includes a cylinder having a piston shaft that is secured at the approximate center of an elongated yoke. A pair of "L"-shaped links are adjustably mounted to the yoke at equal distances from the piston shaft. The links include legs that extend backward, overlapping the mirror surface to mount a wiper blade and wiper blade mount in biased contact against the adjacent mirror surface. Adjustment mechanisms are provided to selectively urge the wiper blade against the mirror surface and to adapt the attachment for mirrors of different size and configuration. A control is provided to connect the cylinder to a source of air under pressure and to selectively operate the cylinder to extend and retract, thereby moving the wiper blade correspondingly across the mirror surface.

14 Claims, 3 Drawing Sheets

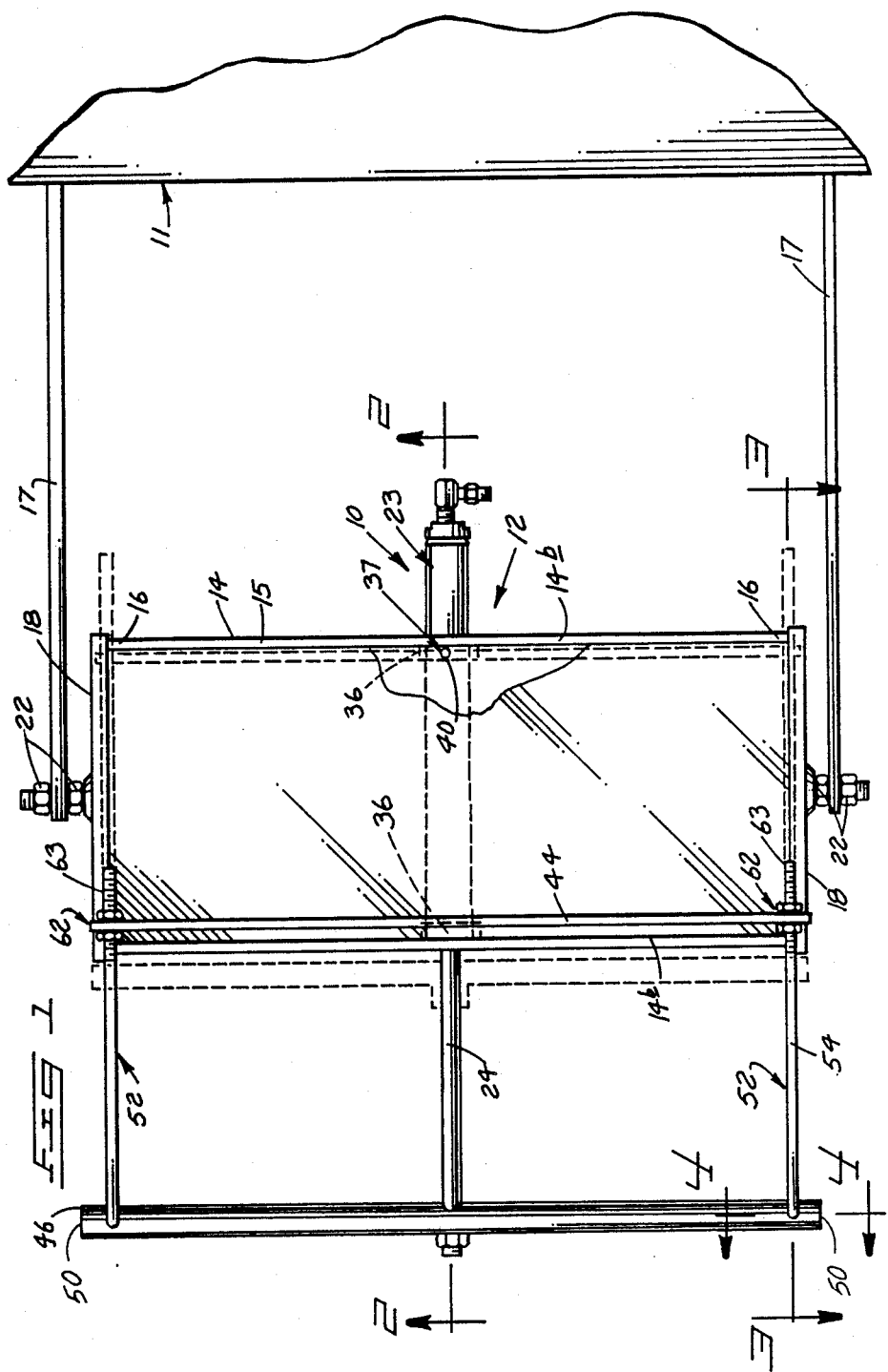

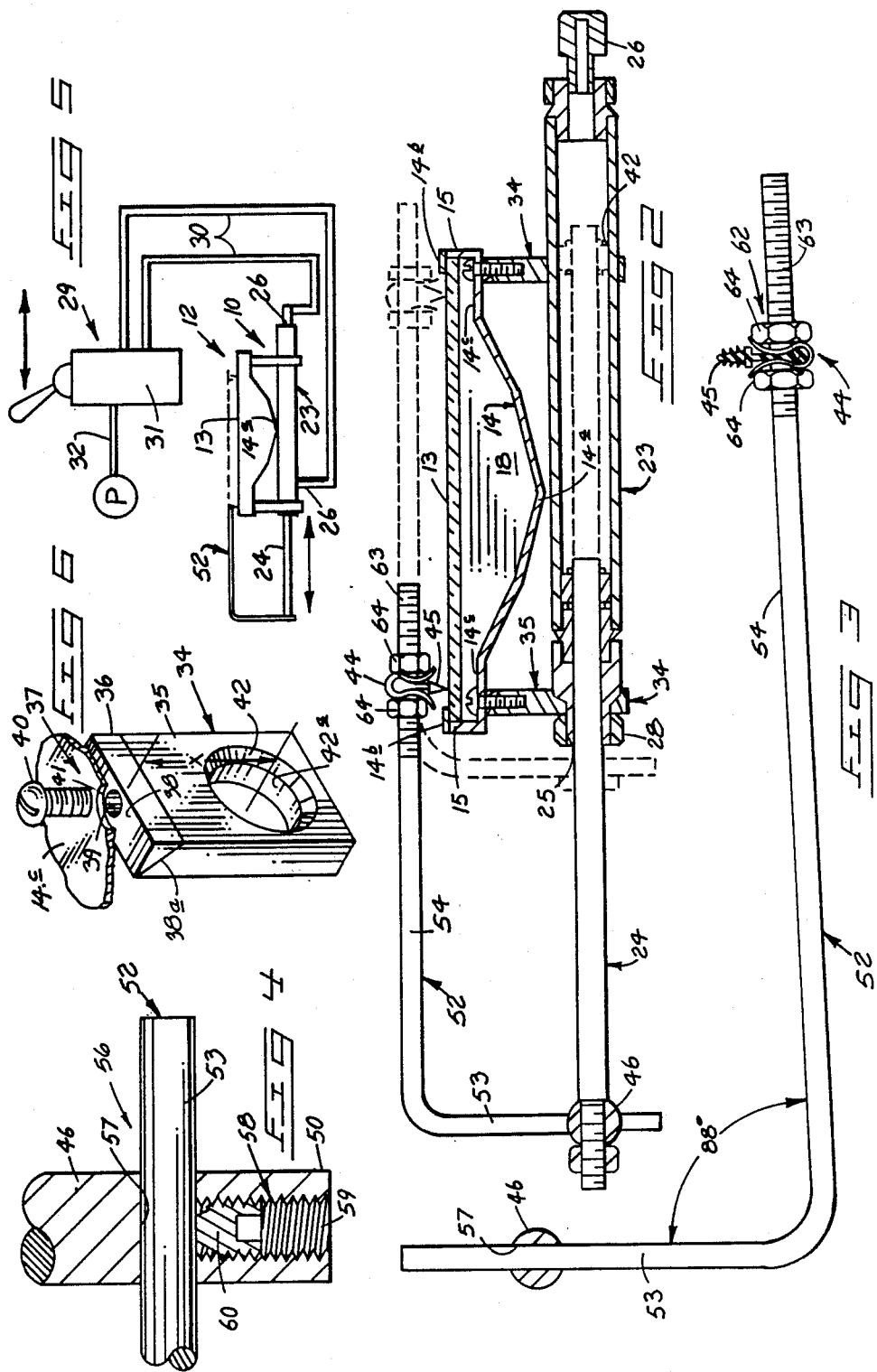

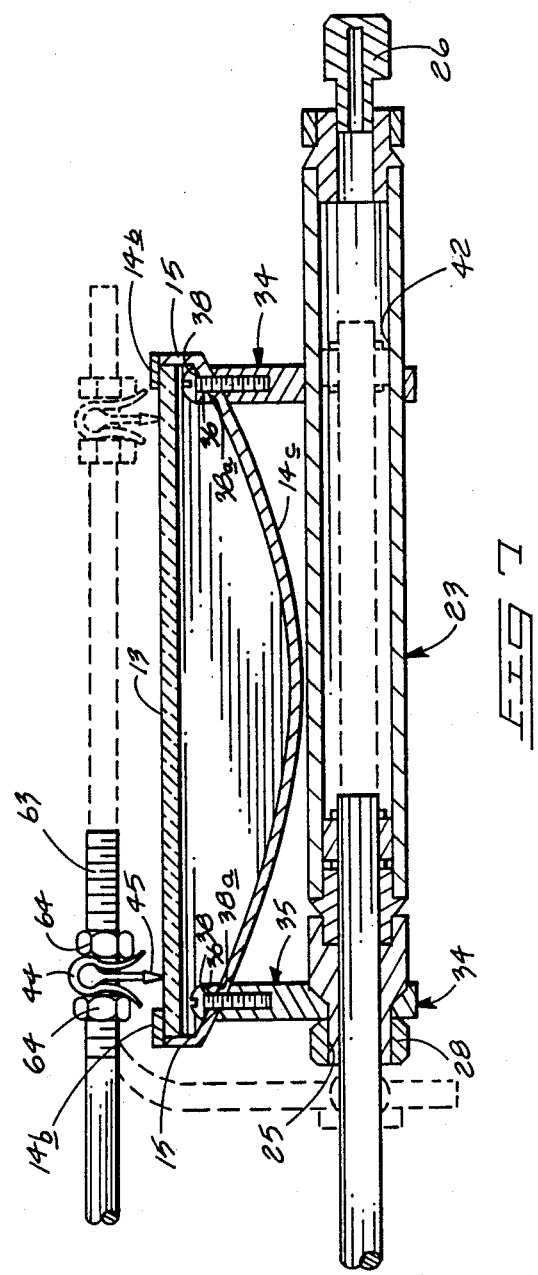

REARVIEW MIRROR WIPER ATTACHMENT

TECHNICAL FIELD

The present invention relates to rearview mirror wipers for vehicles and more particularly to such wipers that may be provided as attachments to conventional rearview mirrors.

BACKGROUND OF THE INVENTION

External rearview mirrors are often utilized in heavy trucking both to reflect the traffic to the rear of the vehicle and to show the driver the condition of the load being carried. Rain, mud or snow splattered across a mirror surface drastically reduces its effectiveness. It has therefore become desirable to obtain some form of mirror wiper arrangement.

The above problem has been realized to limited degree in view of the below listed references.

U.S. Pat. No. 3,968,537 to Wagenhofer discloses a detachable wiper that is mountable to the top of an existing rearview mirror frame. The wiper arrangement uses clamps to secure the wiper drive and wiper blade to the mirror frame. The device drives a wiper blade from the frame top across the surface of the mirror. An electric motor is provided for driving the wiper blade which is cantilevered from the drive mechanism atop the mirror frame. The device must be mounted to mirrors of particular configurations since there does not appear to be provision for adjustments in the mounting mechanism for mirrors of differing configurations. Furthermore, it does not appear there are adjustment capabilities for evenly biasing the full length of the wiper blade along the mirror surface.

U.S. Pat. No. 4,037,286 to Medearis discloses a wiper for rearview mirrors that is very similar to the Wagenhofer arrangement. Medearis, however, incorporates the mirror as an integral part of the entire assembly with heating elements enclosed within the mirror compartment to avoid frost buildup. Medearis discloses a wiper blade that moves vertically along the length of the mirror. The blade is moved through a crank arm arrangement and electric motor that is substantially similar to the Wagenhofer arrangement.

U.S. Pat. No. 4,212,091 to Jones discloses a wiper apparatus for rearview mirrors wherein the wiper is reciprocated across the surface of the mirror by a pair of cylinders. The cylinders are mounted within the body of the mirror frame. The two cylinders are vertically offset from one another and include piston shafts joined in a common upright bar member that reciprocates in response to extension and retraction of the cylinders. A wiper blade carrier assembly is also mounted to the rod for engagement with the mirror surface. No selective adjustments are disclosed since the mirror and wiper assembly are disclosed as a single operational unit. Another rearview mirror and wiper assembly combination is disclosed in U.S. Pat. No. 3,866,258 to DeGraw. Like the Jones reference, DeGraw makes use of a pair of cylinders for extension and retraction to move a wiper blade carriage over an external mirror surface. Springs are provided to return the carriage to a retracted, starting condition following extension of the cylinders.

Another form of integrated wiper and mirror arrangement is shown in U.S. Pat. No. 4,339,169 to Addison. This arrangement makes use of a crank mechanism for effecting wiping motion of a blade across the adjacent mirror surface.

Another integral mirror-wiper combination is disclosed in U.S. Pat. No. 3,685,087 to Pittman. The Pittman mechanism makes use of a motor and chain drive mechanism connected to a wiper carriage for moving the wiper carriage vertically over a mirror surface. A spring mechanism is utilized for adjustably biasing the blade against the mirror surface. The connection between the wiper blade carriage and the wiper blade is situated at the approximate center of the wiper blade frame. The complex drive mechanism and mounting arrangements require the assembly to include the mirror and mirror frame.

U.S. Pat. Nos. 4,306,328 to Layton and No. 4,307,482 to Palmer both disclose other forms of mirror wiping arrangements.

Of the above references, most are relatively complex and, hence, increase the overall cost for the rearview mirror. This is undesirable since the mirrors are typically situated in a relatively hazardous position alongside the vehicle, are subject to damage and require fairly frequent replacement. Replacement costs may be minimized by providing a wiper assembly that is mountable to an existing, commercially available rearview mirror. However, there are several forms of mirrors currently available on the market, and it is does not appear that any of the above referenced wiper attachments would readily adapt to more than one of the commercially available mirrors.

The present invention represents a solution to this problem by providing a wiper attachment that will readily mount to a variety of conventional standard mirror configurations. The present mount and wiper assembly also represents a substantial operational improvement due to its simplicity of construction. For example, the present attachment requires only a single cylinder to drive the wiper carriage across the mirror surface. By using a single cylinder, cost is substantially reduced (over the two-cylinder models), and maintenance is consequently significantly reduced. Operation is another consideration. It is advantageous to use a single cylinder driving a wiper frame since two cylinders connected to the same wiper carriage may bind against one another should their strokes be unequal.

The present wiper attachment may be easily and quickly attached to existing forms of rearview mirror frames without requiring special tools or expertise. Further in this regard, the present wiper attachment mounts to existing mirrors in such a manner that the attachment may not be easily removed from the mirror frame to thereby guard against theft.

BRIEF DESCRIPTION OF THE DRAWINGS

A preferred embodiment of the invention is illustrated in the accompanying drawings, in which:

FIG. 1 is an elevation view of a mirror with the present attachment mounted thereto;

FIG. 2 is a sectional view substantially along line 2—2 in FIG. 1;

FIG. 3 is an enlarged sectional view taken substantially along line 3—3 in FIG. 1;

FIG. 4 is an enlarged sectional view taken substantially along line 4—4 in FIG. 1;

FIG. 5 is a diagram illustrating connection of the present attachment to the source of fluid under pressure;

FIG. 6 is a pictorial detail view of a cylinder mount for the present attachment; and FIG. 7 is a pictorial detail view of the cylinder mount for the present attachment mounted to a mirror having a curved mirror frame.

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

The present wiper attachment is generally shown in the drawings by the reference numeral 10. Wiper attachment 10 is provided preferably as a separate unit that is mountable to an existing, conventional rearview mirror 12 for selectively wiping the mirror surface 13.

The wiper attachment 10 is provided with appropriate mechanisms by which it may be driven from power sources provided by the associated vehicle 11. An appropriate control means 29 is provided to enable the vehicle operator to selectively actuate the wiper attachment 10 to clean the adjacent mirror surface 13.

A conventional mirror 12 is shown in FIGS. 1 and 2. These figures show the mirror 12 including a planar mirror surface 13 that is mounted by a relatively rigid mirror frame 14. The mirror frame 14 extends to one side of the mirror, typically facing in a forward direction with respect to the intended forward direction of travel for the associated vehicle 11.

The mirror 12 and mirror frame 14 are typically elongated, including longitudinal side edges 15 joined by transverse end edges 16. Mounts 17 typically extend from the end edges 16 to the vehicle 11. The mounts 17 may vary in configuration depending upon manufacturer design, but typically include an end frame mounting arrangement generally as shown in FIG. 1.

FIG. 2 illustrates the cross-sectional configuration of an exemplary mirror frame configuration 14. The frame 14 includes a forwardly arched central portion with an apex or forwardmost projection at surface 14a. The surfaces leading to the apex surface 14a shown are substantially geometrical. Other conventional and commercially available mirrors include somewhat similar surfaces, often convex in the nature of the form substantially as shown in FIG. 7.

The dimension between the furthest outward surface projection 14a and a corresponding point along the mirror surface 13 is the major mirror thickness dimension. This dimension typically varies from one manufacturer to another but may be between, for example, 1.25 inches to approximately 1.50 inches.

Many conventional mirrors also include flat edge surfaces 14b extending along the side edges 15. These surfaces 14b are included as portions of flange fittings for slidably receiving the mirror plate 12a. The mirror plate 12a is usually installed by removing plastic end frame covers 18 that are typically provided to cover the frame end edges 16 and to overlap the mirror thickness between the surfaces 14a, 14b and the mirror plate 12a. With covers 18 removed, the mirror plate will slide longitudinally along the adjacent flange areas 14b of the mirror frame. The flanges 14b overlap the mirror surface to retain the longitudinal side edges of the mirror plate 12a.

The end covers 18 are releasably secured over the frame ends and corresponding transverse ends of the mirror plate to secure the mirror plate 12a in position.

The end covers 18 are typically held in position by appropriate nuts 22 on mounts 17.

The above description of conventional mirror and frame arrangements will lead to a better understanding of the present invention which will be described in greater detail below.

The present attachment 10 includes an elongated fluid operated cylinder 23. Cylinder 23 is advantageously a double-acting pneumatic cylinder that will operate from a conventional source of fluid, preferably air pressure as typically provided with the associated vehicle. The cylinder 23 is therefore preferably an air cylinder, selectively operated by pressurized air to extend and to retract its piston rod 24.

It is preferred that the cylinder be selected to include an effective stroke length for the piston rod 24 of approximately six inches. It has been found that a six-inch stroke length will facilitate adaptation of the present wiper arrangement to many currently available forms of rearview mirrors.

The piston rod 24 is slidably mounted within the cylinder 23 to extend and retract along a central axis. This axis is also coaxial with the cylindrical configuration of the cylinder body.

Opposite ends of the cylinder 23 include connector fittings 26 that lead to internal chambers of the cylinder which are relatively conventional and, as such, need not be discussed in great detail herein. The connector fittings 26 are provided for connection to a control means 29 which is generally shown in FIG. 5.

The control means 29 includes a pair of air pressure lines 30 leading to a selectively operable valve 31. A line 32 extends from the valve 31 to a source of air under pressure such as a pump, compressor, vacuum line, etc., that may be accessed from within the associated vehicle 11.

The valve 31 may be manually switched to selectively control feed of pressurized air flow from one line 30 to the other. In one position, the switch will direct pressurized air flow into the cylinder to cause the piston rod 24 to extend. In another position, the switch will direct pressurized air through the remaining line 30 and correspondingly cause the piston shaft to retract.

It is of significance to note that the valve 31 is operable to selectively control the cylinder to extend or retract. There is no automatic return provision that, like other wiper attachments, would cause the wiper blade to return automatically from an extended position to a starting position. The operator is therefore able to move the wiper blade across the mirror surface in a single movement. This is an advantage since in many instances a double action movement of the wiper (as provided with other wipers) would smear the mirror surface.

A mount 34 is provided and is adapted to secure the cylinder 23 to the mirror frame. The mount 34 is provided to secure the cylinder preferably with the central piston rod axis lying substantially parallel to the plane of the mirror surface 13. It is advantageous to center the mount 34 along the length dimension of the mirror frame between end covers 18.

The mount 34 advantageously includes a pair of bracket assemblies 35, each secured along an edge surface 14c of the mirror frame (FIG. 2). Each bracket 35 includes a separable base section 36 (FIG. 6). The base sections 36 preferably include flat and angular clamp surfaces 38, 38a that are provided for selective engagement against mirror frame surfaces, according to the frame surface configuration as shown by comparison of FIGS. 2 and 7.

The clamp surfaces 38, 38a may be selected to conform with flat (FIG. 2) surfaces or convex (FIG. 7) surfaces as desired. The separable base sections may simply be arranged as shown in FIGS. 2 and 6 to accommodate flat mirror frame surfaces, or assembled as shown in FIG. 7 to accommodate curved or angular convex mirror frame surfaces. The bracket assemblies therefore afford substantially universal mounting surfaces, adapting the present attachment to be mounted to a wide variety of mirrors.

Clamp means 37 are provided that are engageable with the brackets 35 for securing the brackets 35 to the mirror frame 14. The clamp means 37 may include unthreaded apertures 41 formed through the base sections 36 and aligned threaded bores 39 formed into the brackets from the clamp surfaces 38. The clamp means 37 may also include headed fasteners such as screws 40 that may be threadably received within the threaded bores 39. Shanks of the screws will pass through the apertures 41 and appropriate apertures (FIG. 6) formed through the mirror frame surface 14c during the installation process. The mirror frame and separable base sections 36 may thus be securely clamped between the screw heads and the bases 35.

Each of the cylinder mount brackets 35 includes a cylinder mount surface 42 spaced outwardly from its base end section 36. The surfaces are, as shown in the drawings, preferably circular to enclose adjacent portions of the cylinder. They may also be of other configurations including split clamp arrangements that would facilitate mounting and removal of the cylinder.

One of the brackets 35 (FIGS. 2 and 6) includes a counter bore configuration 42a for receiving a mounting end 25 of the cylinder 23. The counter boar 42a and the cylinder mounting end 25 mate as shown in FIG. 2. The cylinder mounting end may be threaded and secured by a nut 28 so the associated mounting bracket is sandwiched between the cylinder mounting end and the nut 28. The remaining bracket may simply be apertured (as shown at the right side in FIG. 2) to slidably receive the remaining end of the cylinder body.

It is important to note the effective distance between the bracket clamp surfaces 38 and the axis of the circular cylinder mount surfaces 42. It is preferred that this dimension be sufficient to enable mounting of the cylinder with the surface of the body clear of the mirror frame surface 14a substantially regardless of the frame configuration. It has been found that a distance X (FIG. 6) of approximately 1.38 inches from the clamp surfaces 38 to the center axis of the circular cylinder mount surfaces 42 is sufficient, given a cylinder diameter of approximately 0.815 inches, to allow mounting of the present assembly to mirrors having different frame configurations.

A wiper carriage means 43 is attached to the piston rod and is adapted to extend therefrom to overlap the mirror surface 13. The carriage means 43 selectively moves across the surface 13 in response to extension and retraction of the cylinder 23. A wiper blade mount 44 is provided on the carriage means 43 and is adapted to mount a wiper blade 45 for engagement with the mirror surface.

More specifically, the wiper carriage means 43 includes a yoke 46 that is elongated between ends 50 (FIG. 1) and is attached at its approximate longitudinal center to the piston rod 24 for movement therewith. It is preferred that yoke 46 be constructed of an elongated metallic rod, preferably aluminum to avoid corrosion. The rod length between ends 50 may be substantially equal to or just slightly greater than the overall length of the mirror 12.

At least two "L"-shaped links 52 are provided, each having a first leg 53. The first legs 53 are mountable to the yoke 46 at positions thereon preferably spaced equidistant along the length of the yoke from the point of attachment with piston rod 24. Each link 52 also includes a second leg 54 that extends backward to overlap the length of the piston rod 24 and mirror surface 13 (as viewed in FIG. 2).

The links 52 are advantageously formed of a strong, resilient metal such as stainless steel. Such material is selected to be resistant to corrosion, to provide sufficient strength to carry the wiper mount 44 and of sufficient resilience to yieldably urge the wiper blade 45 against the mirror surface.

FIG. 3 illustrates further details of a link 52 including means for biasing the wiper 45 against the mirror surface 13. Such means is advantageously incorporated in legs 53 and 54 and the angular relationship they form with one another. This angle is acute, advantageously approximately 88° as shown in FIG. 3. The legs 54 are therefore normally oriented in a plane that is inclined toward the piston rod axis, when the links are mounted to the yoke. The legs 54 will deflect, opening to a 90° relationship with legs 53 when the attachment is mounted to a mirror as shown in FIG. 2. The resilient legs will attempt to return to the normal 88° orientation and, by doing so, will urge the wiper blade 45 against the mirror surface.

An adjusting means 56 is provided on the wiper carriage means for adjustably positioning the wiper blade mount 44 to accommodate mirrors of varying thickness dimension (between the frame surface 14a and mirror surface 13). This adjustment feature is important to enable mounting of the present apparatus to a variety of rearview mirrors.

Adjusting means 56 advantageously includes a pair of link receiving apertures 57 formed through the yoke 46. It is desirable that the apertures 57 (FIG. 4) be oriented at substantially right angles to the piston rod 24 (FIG. 2) and situated at equal distances from location along the yoke 46 where the piston rod 24 is mounted (FIG. 2). For minimal visual interruption along the mirror surface 13, it is preferred that the apertures 57 be positioned to mount the links along the yoke adjacent the yoke ends 50.

Each of the apertures 57 (FIG. 4) slidably receives a leg 53 of an "L"-shaped link 52. A lock means 58 may be provided to releasably secure the received leg 53 at a selected position within the aperture. Lock means 58 is advantageously comprised of axial threaded bores 59 formed into the yoke 46 from its ends 50. Each bore 59 threadably receives a set screw 60. The set screws 60 may be selectively turned to bring ends thereof into clamping contact with adjacent surfaces of link legs 53, one of which is shown in FIG. 4. Spacing between the remaining link legs 54 and the mirror surface 13 may be adjusted by selectively sliding the legs 53 in or outwardly through the apertures 57. The selected positions will be held by the set screws 60.

As indicated earlier, the wiper blade mount 44 is mounted to the "L"-shaped links 52. It is advantageous that the mount 44 be selectively positionable along the legs 54 of links 52 by an adjusting means generally shown at 62.

The adjusting means 62 may be provided as elongated threaded sections 63 of the link legs 54. The threaded sections 63 may be received through appropriate apertures formed through the blade mount 44. Clamp nuts 64 may be threadably engaged along the threaded sections 63 and turned to selectively clamp the blade mount 44 at a selected position along the legs. The wiper blade mount 44 may be positioned by the nuts 64 along the legs to vary the path over which the wiper will move in response to operation of the cylinder. This is another adjustment feature that facilitates adaptation of the present attachment to mirrors of differing configurations.

A further advantage of the present invention lies in the use of the single cylinder 23 at its centered location with respect to the length of the yoke 46 and the positions of the links 52 along the yoke, equidistant from the cylinder axis. The centered single cylinder 23 facilitates equal division of outward and inward stroke forces along the yoke 46 through the piston rod 24. These translational forces are transmitted directly through the piston rod 24, to the yoke 46 and to the opposite ends of the wiper blade mount 44 through links 52. There will therefore be little if any binding forces acting on the piston rod 24 during operation.

Installation of the present attachment is simplified and made substantially universal by the particular features discussed above. Prior to installation, the mirror 12 is dismantled by removing the end covers 18 and sliding the mirror plate from engagement with the side flanges of the frame 14. This exposes the edge surfaces 14c for drilling. Apertures are drilled or otherwise formed (if not already provided by the manufacturer) through the mirror frame surfaces 14c at locations centered along the length dimension of the frame between end edges 16. The apertures are preferably aligned along a line that is perpendicular to the side edges 15 in order to properly orient the brackets 35 and cylinder 23 in relation to the frame 14 and mirror surface 13.

Next, the cylinder 23 and wiper mount 44 are secured to the mirror frame. This is done by selectively assembling the brackets and base ends 36 over the frame with the clamp surfaces 38 and 38a in flush engagement with the mirror edge frame surfaces 14c. The open apertures 41 and the threaded bores 39 are held in alignment with the holes previously bored in the frame. The fasteners 40 are then secured from inside the frame to effectively clamp the frame between the screw shoulders and the brackets 35. Note the headed ends of the fasteners 40 are situated inside the mirror frame and will be hidden from view and access when the mirror is reassembled. This arrangement deters theft of the attachment.

Only the two fasteners 40 are required to mount the present attachment to the mirror 12. The carriage means 43 may be preassembled and mounted simultaneously with the cylinder and cylinder mounts. This is a distinct advantage over other forms of wiper assemblies that must be mounted within the mirror frame.

The mirror plate 12a may now be mounted back into the mounting flanges 14b of the mirror frame after the cylinder mount 34 has been attached to the mirror frame. The wiper carriage may now be positioned and adjusted as required.

Some adjustments may be needed to properly position the wiper blade 45 against the mirror surface 13. This may be done first by operation of the adjusting means 56. The set screws 60 may be released to facilitate sliding motion of the link legs 53 in yoke apertures 57. Axial motion of the link legs in these apertures facilitates adjustment of the blade mount toward or away from the mirror surface. It is desirable to position the blade mount in such relationship to the mirror surface that the wiper blade 45 will be continuously urged against the mirror surface by the resilient links. More or less biasing force may be provided simply by sliding the legs 53 inward or outwardly through the apertures 57 and by subsequently turning the set screws 60 to lock the legs in the selected positions.

As described above, the legs 54 of the "L"-shaped links lie in a plane that is inclined from the legs 53 toward the piston rod axis. The piston rod axis is substantially parallel to the mirror surface when the attachment is mounted. The legs 54 are normally inclined with respect to the mirror surface 13 but are resilient along their lengths and can be straightened parallel to the mirror surface by use of the adjusting means 56. This feature enables positioning of the wiper blade with a selected amount of force applied through the legs to press the wiper blade 45 against the mirror surface 13. The adjustment procedure is accomplished by first loosening the set screws 60 and adjusting the blade to lightly touch the mirror surface. The link legs 53 are then pressed through the apertures 57 to spring the legs open until the legs 54 become substantially parallel to the mirror surface in FIG. 2. The legs 54 then press the wiper blade against the mirror surface due to the inherent resiliency of the links 52. Additional force may be applied if desired by pressing the legs 53 further through the adjusting apertures 57 before setting the screws 60.

Width adjustments via adjusting means 62 accommodate the corresponding width of the mirror surface 13 by setting the blade mount 44 along the link legs 54. This adjustment may be accomplished by first fully retracting the piston rod 24 so the legs 54 fully overlap the mirror surface. The nuts 64 can then be selectively adjusted along the threaded section 63 of the links to position the wiper blade 45 along the adjacent side edge of the mirror. Once the desired position is selected, the clamp nuts 64 can be retightened to securely clamp the wiper blade mount 44 in the selected position.

The above two adjusting procedures may also be accomplished with the mirror mounted to the vehicle as shown in FIG. 1. Thus, periodic adjustments may be made without requiring removal of the attachment from the mirror or removal of the mirror from the vehicle.

Once the present attachment has been secured to the mirror and mirror frame, the entire assembly may be remounted to the vehicle substantially in the manner shown in FIG. 1. It should be noted that the mirror may be mounted to the vehicle as shown with the piston rod oriented to extend outward of the vehicle upon extension of the cylinder (as shown in FIG. 1). Alternatively, the mirror frame may be reversed so that extension of the cylinder will result in movement of the carriage toward the vehicle 11. Choice of mounting is determined by the physical characteristics of the vehicle and the desires of the installer.

It may also be understood that attachments 10 may be provided for each mirror, on opposite sides of the vehicle. The mounting arrangements described above will facilitate mounting to either left or right hand rearview mirrors without requiring special right or left hand mounting components.

The cylinder 23, once mounted with mirror 12 to vehicle 11, may be connected to the control means 29. This is done simply by connecting the lines 30 to the appropriate fittings 26 of the cylinder and by extending the lines through a window molding or other appropriate opening into the vehicle cabin. The lines provided will typically be of sufficient length to enable mounting of the valve switch 31 within easy reach of the vehicle operator. The valve switch 31 may be mounted to the vehicle dash, for example, by conventional fastening methods. The line 32 may then be connected to a source of pressurized fluid (preferably air pressure) by conventional fittings (not shown) that may or may not be supplied with the attachment. A conventional "T" fluid coupling (not shown) may be supplied to splice the line 32 into an existing fluid pressure line within the vehicle. This step completes installation. The wiper assembly is now ready for use.

Operation is initiated as the vehicle operator actuates the valve switch 31. Actuation of the valve switch 31 in one direction will cause pressurized air to flow to one side of the cylinder 23 and cause the piston rod 24 to extend. The extending piston rod 24 will carry the yoke 46 and wiper carriage means 43 including wiper 45 outwardly through the full stroke or until the wiper is stopped against the mirror frame. The cylinder and wiper will then stay in the extended position until the operator moves the valve switch 31 to another position at which air is directed through an opposite line 30 to another position at which air is directed through an opposite line 30 to an opposite end of the cylinder to cause the piston rod 24 to retract. The rod 24 correspondingly moves the wiper blade 45 back to its initial starting position.

The above operation may be repeated successively as needed to maintain the mirror surfaces in clear and unobstructed condition.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A wiper attachment mountable to a conventional vehicle rearview mirror having a mirror surface mounted to a mirror frame, the attachment being adapted to mount a wiper blade for wiping movement across the mirror surface, the wiper attachment comprising:

a single elongated double acting fluid powered cylinder having a piston rod therein with an outward end movable responsive to fluid pressure within the cylinder along a piston rod axis through an extension stroke wherein the piston rod end is moved outward of the cylinder to an extended position spaced from the cylinder and a retraction stroke wherein the piston rod end is moved along the piston rod axis to a retracted position adjacent to the cylinder;

control means adapted to connect the cylinder to a source of fluid under pressure and operable to alternatively direct fluid under pressure into the cylinder to thereby cause the piston rod to move through the extension or retraction stroke;

a mount adapted to secure the cylinder to the mirror frame;

an elongated yoke attached at its approximate center along the length thereof to the piston rod for movement therewith;

"L"-shaped links each having a first leg thereof mounted to the yoke at a position along the yoke spaced from the piston rod and having a second leg joined to the first leg and extending to an end overlapping the piston rod;

link adjusting means on the yoke for selectively adjusting the distance from the yoke to the second legs of the "L"-shaped links;

a wiper blade mount adapted to releasably receive a wiper blade; and wiper blade mount adjusting means, mounting the wiper blade mount to the second legs of the "L"-shaped links for selectively positioning the wiper blade mount along the second link legs toward or away from the first legs thereof.

2. The wiper attachment of claim 1 wherein the link adjusting means is comprised of:

link receiving apertures formed through the yoke spaced to opposite sides of the piston rod and equidistant therefrom, for slidably receiving the first legs of the links; and lock means for locking the first legs at selected positions along the lengths thereof within the link receiving apertures.

3. The wiper attachment of claim 2 wherein the links are formed of elongated rods being resilient along the lengths thereof and adapted to spring bias the wiper blade mount toward the mirror surface.

4. The wiper attachment of claim 2 herein the yoke is formed of:

an elongated rod having axial threaded bores extending inwardly from rod ends and opening into the link receiving apertures; and set screws threadably engageable within the axial threaded bores and operable to selectively clamp the first link legs to the yoke.

5. The wiper attachment of claim 1 wherein the links are comprised of elongated rods and wherein the wiper blade mount adjusting means is comprised of:

elongated threaded sections along the second link legs; and clamp nut means threadably engageable with the elongated threaded sections for selectively positioning the wiper blade mount along the sections and for securely holding the wiper blade mount.

6. The wiper attachment of claim 1 wherein the cylinder mount is comprised of:

a cylinder mount bracket having a base end section and a cylinder mount surface thereon spaced from the base section, the base end section including surfaces selectively positionable and adapted to mount the cylinder to mirror frames of various configurations; and clamp means engageable with the base end of the cylinder mount bracket and adapted to secure the cylinder mount bracket to the mirror frame.

7. The wiper attachment of claim 6 wherein the clamp means is comprised of:

clamp surfaces on the base end section of the cylinder mount bracket adapted to conform to a surface of the mirror frame and an aperture extending through the end section between the clamp surfaces;

a threaded bore extending into the cylinder mount bracket; and a headed fastener extendable through the end section aperture, threadably receivable within the bore, adapted to clamp the bracket to the mirror frame.

8. The wiper attachment of claim 1 for a rectangular mirror with a mirror surface having a width dimension and a length dimension, wherein the stroke of the piston rod is of a length substantially equal to the width dimension of the mirror surface, and wherein the length of the blade mount is substantially equal to the length dimension of the mirror surface.

9. The wiper attachment of claim 1 wherein the second legs of the "L"-shaped links lie in a plane that is inclined from the first legs toward the piston rod axis.

10. A wiper attachment mountable to a conventional vehicle rearview mirror having a mirror surface mounted to a mirror frame, the attachment further being adapted to mount a wiper blade for wiping movement across the mirror surface, the wiper attachment comprising:

a single elongated double acting fluid powered cylinder having a translationally movable piston rod therein;

control means adapted to connect the cylinder to a source of fluid under pressure and operable to selectively direct fluid under pressure into the cylinder to thereby cause the piston rod to move translationally between extended and retracted positions;

a mount adapted to secure the cylinder to the mirror frame externally thereof;

wiper carriage means mounted to the piston rod and adapted to extend therefrom to overlap the mirror surface and to selectively move across the mirror surface in response to selective operation of the cylinder;

a wiper blade mount on the wiper carriage means adapted to mount the wiper blade thereon for engagement with the mirror surface; and adjustment means on the wiper carriage means adapted for adjustably positioning the wiper blade mount to accommodate mirrors having varying thickness dimensions between the mirror surfaces and mirror frames thereof.

11. The wiper attachment of claim 10 further comprising biasing means for yieldably urging the wiper mount toward the mirror surface.

12. The wiper attachment for a rearview mirror having a rectangular mirror surface and mirror frame with longitudinal side edges and transverse end edges as claimed by claim 10 wherein:

the mount includes a cylinder mount surface and a mirror frame clamp means adapted to secure the single cylinder to the mirror in a substantially centered position between ends of the mirror frame and with the piston rod oriented substantially perpendicular to the longitudinal mirror side edges;

wherein the wiper carriage means is elongated to span the length dimension of the mirror surface; and wherein the piston rod is mounted at a point substantially centered along the length of the carriage means.

13. The wiper attachment of claim 10 wherein the cylinder mount is comprised of:

a cylinder mount bracket having a base end section and a cylinder mount surface thereon spaced from the base section, the base end section including surfaces selectively positionable and adapted to mount the cylinder to mirror frames of various configurations; and clamp means engageable with the base end of the cylinder mount bracket and adapted to secure the cylinder mount bracket to the mirror frame.

14. The wiper attachment of claim 13 wherein the clamp means is comprised of:

clamp surfaces on the base end section of the cylinder mount bracket adapted to conform to a surface of the mirror frame and an aperture extending through the end section between the clamp surfaces;

a threaded bore extending into the cylinder mount bracket; and a headed fastener extendable through the end section aperture, threadably receivable within the bore, adapted to claim the bracket to the mirror frame.

* * * * *